United States Patent [19]

Forkner

[11] 4,020,188
[45] Apr. 26, 1977

[54] COOKED DOUGH HAVING A FROZEN DESSERT FILLING AND METHOD THEREFOR

[76] Inventor: John H. Forkner, 2116 Mayfair Drive West, Fresno, Calif. 93703

[22] Filed: Nov. 28, 1975

[21] Appl. No.: 636,134

[52] U.S. Cl. .................................. 426/95; 426/565; 426/438; 426/496; 426/502

[51] Int. Cl.$^2$ .................... A21D 13/08; A23G 9/04

[58] Field of Search ............. 426/94, 95, 565, 101, 426/439, 440, 524, 496, 502

[56] References Cited

UNITED STATES PATENTS

| | | | |
|---|---|---|---|
| 1,445,187 | 2/1923 | Vaughan | 426/95 |
| 1,511,878 | 10/1924 | Gargay | 426/95 |
| 2,092,160 | 7/1937 | Hawerlander | 426/94 |
| 2,404,177 | 7/1946 | Jetschmann | 426/95 |
| 2,668,117 | 2/1954 | Bucci | 426/21 |
| 3,911,155 | 10/1975 | Ferrero | 426/94 |

OTHER PUBLICATIONS

Coulson, Z. Ed. The Good Housekeeping Cookbook, New York, 1973, p. 579.

*Primary Examiner*—Jeanette M. Hunter
*Attorney, Agent, or Firm*—Flehr, Hohbach, Test, Albritton & Herbert

[57] ABSTRACT

A method for making food products having an inner filler of frozen dessert and an outer layer of cooked dough. The filling is enclosed within a layer of farinaceous dough which has an inner layer forming a protective backing. The product is cooked in such a manner that the outer dough layer is cooked without substantial modification of the filling or the protective backing. The products before cooking can be stored under refrigeration and marketed as such.

16 Claims, 12 Drawing Figures

COOKED DOUGH HAVING A FROZEN DESSERT FILLING AND METHOD THEREFOR

BACKGROUND OF THE INVENTION

This invention relates generally to the manufacture of food products of the type including a filling and a cooked farinaceous dough surrounding the filling. It also relates to food products resulting from such methods.

A wide variety of edible products have been made by commercial bakers and in the home which comprise a filling of edible material, such as a fruit jam, surrounded by dough that has been cooked as by baking or deep-fat frying. It is recognized that such methods and products have certain limitations. Particularly, the filler is heated during cooking, which limits the character of filling materials that can be used and may impair the quality and flavor of the finished product. If the filling is liquified during cooking, it is partially absorbed into the surrounding dough, and may extrude from the product with the result that it causes burning and sticking to a baking pan or pollution of hot oil used in deep-fat frying. To avoid or minimize liquefaction during cooking, the filling may be formulated with stabilizers which impart viscosity and body, such as starch, cereal flour, gums and the like. This practice tends to impair the flavor of the product, and in any event does not prevent flavor impairment or other deterioration of heat-sensitive components.

Some edible products have been made with a layer of cooked dough surrounding a frozen dessert like ice cream. A thin layer of unleavened dough is wrapped about a mass of frozen ice cream and the assembly is immersed in hot fat for a sufficient time to cook and brown the dough. Upon removal from the fat, the product is served for immediate consumption, usually by introducing it into a dish containing a topping like chocolate syrup. This method is useable for restaurants and like establishments where the products are being made for immediate serving, but it is not applicable to present-day marketing methods where it is necessary to store products for substantial periods before they reach the hands of the consumer. The ice cream filling is partially melted during the processing, and the thin cooked dough is relatively fragile. The use of thicker dough would require longer baking time which would cause further melting of the filling.

A characteristic of the above methods and products is that during the cooking period the heated dough is in physical contact with the filling whereby heat is directly conducted to the filling material. Also there is no support for the dough during or after cooking except for the support that it may have because of its association with the filling, whereby breakage is apt to occur during processing or subsequent handling. The melted portion of the flling is directly in contact with and penetrates the dough during and after cooking, thus modifying the strength and character of the dough.

U.S. Pat. Nos. 3,260,694 dated July 19, 1966, and 3,335,015 dated Aug. 8, 1967, disclose methods for the dehydration of various food products by immersing the product in hot oil being subjected to a partial vacuum, the oil being at such a temperature as to cause rapid evolution of water vapor. The prime objective of such methods is to obtain rapid evolution of moisture, thus minimizing the time period over which the product is subjected to an elevated temperature. One of the cooking techniques hereinafter disclosed makes use of features of the method disclosed in these patents.

SUMMARY OF THE INVENTION AND OBJECTS

In general, it is an object of the present invention to provide a method for the commercial manufacture of food products of the type including a filling and a surrounding layer of dough, the method being such that it produces products that can be stored and marketed to the consumer in retail outlets.

Another object is to provide an improved method for making edible products having a frozen filling (e.g., ice cream) which overcomes the disadvantages of prior methods and products referred to above.

Another object is to provide a method which completes cooking of the surrounding dough layer without any substantial modification or deterioration of the filling.

Another object is to make possible the use of dough having a chemical leavening agent, thereby providing a cellular cooked dough structure in the final product, the method being such that the dough structure is strengthened and penetration of filling material into the dough before, during and after cooking is prevented.

Another object is to provide a short cooking cycle in hot oil, with the dough being initially in frozen condition, thereby forming a structural shell about the frozen filler, the dough being thawed simultaneously with inwardly progressing cooking action. In this connection, the preferred method is characterized by immersion of the product in hot oil under partial vacuum, followed by rapid selective cooking of the dough during which the dough is expanded both by the leavening agent and the partial vacuum.

Another object is to provide novel assemblies which are adapted for use in carrying out the method.

Another object is to provide edible products comprising a filling which has not been detrimentally affected by heat during a cooking operation and a surrounding layer of cooked dough whch is adapted to be eaten together with the filling.

Another object is to provide edible products comprising a frozen dessert filler and a surrounding layer of leavened and cooked dough, the product having a protective backing layer adhered to the inner surface of the dough layer, the backing layer serving to isolate the filling from the cellular dough. The backing layer may be of such material as to impart a mough feel and eating property differing from the outer dough and may also impart more desirable flavors and color characteristics.

In general, the method involves forming an assembly consisting of a non-dough filling and a layer of moist farinaceous dough surrounding the filling. The dough layer is formed from sheeted dough with a protective backing layer applied over and adhered to its inner surface. The assembly is subjected to exteriorly applied heat to cook the dough to form a layer having a desired crumb structure. During the cooking cycle the temperature and holding times are so controlled as to complete cooking of the dough layer without materially affecting the filler. At the end of the cookin cycle the product may be chilled and thereafter may be stored under refrigeration for marketing. The products involved include both the assemblies as prepared for the cooking cycle, and the finished products resulting from the method which have been cooked and are ready for eating. In a preferred embodiment of the method and product, the filling is a frozen dessert such as ice cream and is at a low temperature (e.g., minus 20 to minus 40° F.) at the start of the cooking cycle. A preferred procedure for the cooking cycle involves immersion of the product in hot oil under partial vacuum.

Additional objects and features of the invention will appear from the following description in which the preferred embodiments have been set forth in detail in conjunction with the accompanying drawing.

DESCRIPTION OF THE PREFERRED EMBODIMENTS

Figure 1:
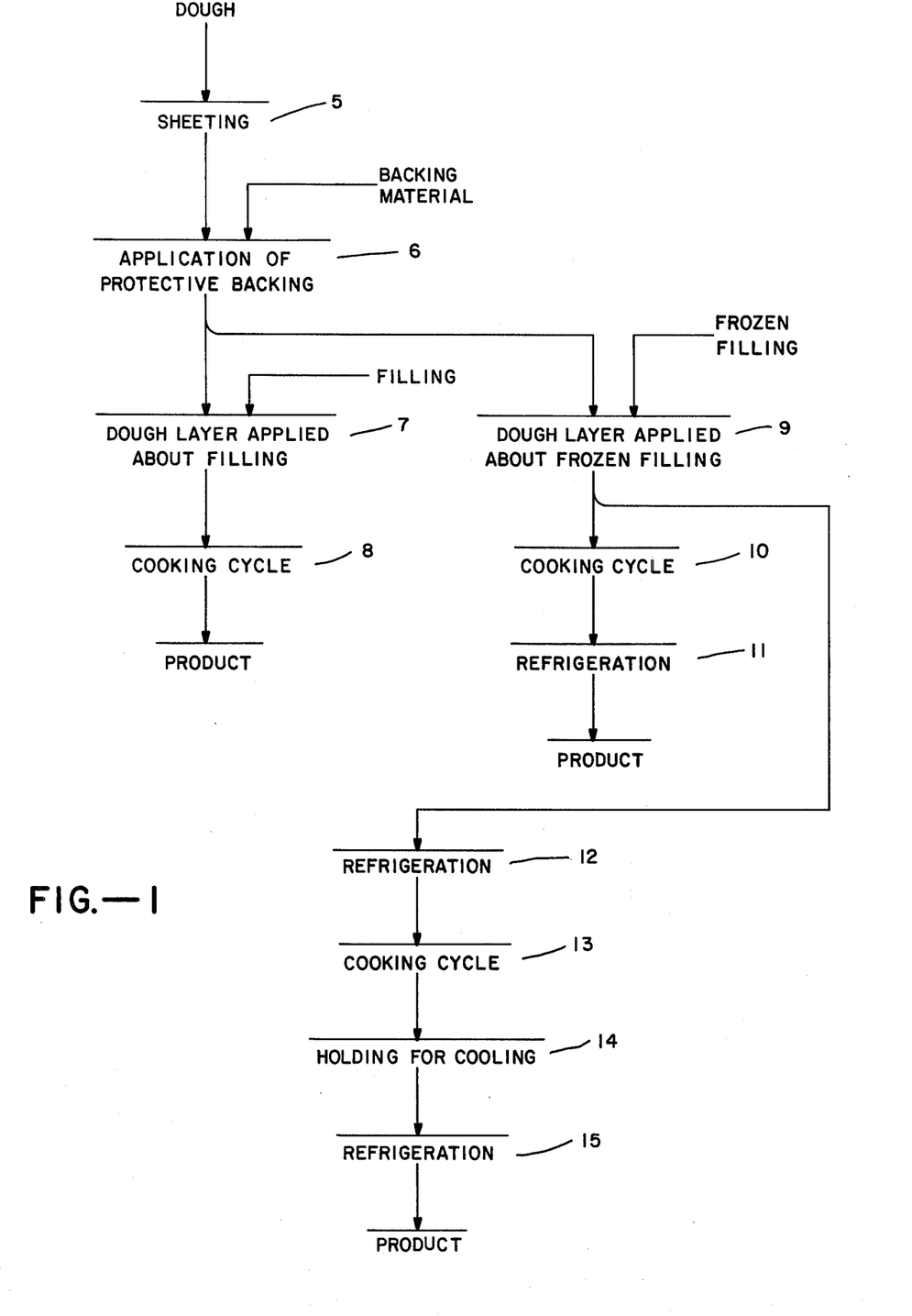
FIG. 1 is a flow diagram illustrating procedures for carrying out the method.

As illustrated in FIG. 1, the method involves sheeting a suitable farinaceous dough in step 5. As will be presently explained in greater detail, the dough may vary in composition, and may for example be a simple pie crust type of dough consisting mainly of cereal flour and shortening, or preferably any one of many doughs which are commonly used in the manufacture of bakery products, and which are provided with a chemical leavening agent. Of the latter, particular reference can be made to doughs such as are used in the manufacture of bread, sweet rolls, doughnuts and cookies. Preferably the dough sheets are relatively thin, as for example, of the order of from 1/16 to ⅛ inch thick. In step 6 an edible protective backing is applied to one side surface of the dough sheets. The backing material should have properties as subsequently described and can be applied in plastic form to a thickness compatible with the thickness of the dough sheet (e.g., 1/16 inch for a dough sheet 1/16 inch thick). As will be presently explained, the filler preferably is applied to the dough sheet as a soft or plastic material, and then hardened by refrigeration before cooking.

The filler when in the form of a frozen dessert is preferably of the type including milk solids together with sugar and stabilizers such as gelatins or vegetable gums. Such frozen desserts are sold under the names of ice cream, imitation ice cream and ice milk dessert, and by aeration are made with from 30 to 200% overrun. The frozen filler may be in the form of a block or slab which is at a relatively low temperature (0° F. or below, preferably −20° to −40° F.), or it may be in the form of a soft ice cream which can be pumped and introduced in desired measured amounts into the assembly chilled to a lower temperature before cooking. The enveloping layer of dough is sealed whereby the inner filling is not exposed to the exterior of the assembly. After forming such assemblies in step 7, they are preferably chilled and may be stored at a low temperature level preparatory to carrying out a cooking cycle. Chilling of the complete assembly to a low temperature (e.g., −0° to −40° F. for frozen fillings) serves to harden the filling, the dough layer, and the protective backing. Also it provides a filler which can absorb a substantial amount of heat during cooking without any appreciable liquefaction of the material or loss of overrun. In addition, the retained frozen state of the filling at the end of the cooking cycle makes for rapid cooling of the cooked layer and ensures retention of the physical form of the filling, whereby the filling provides support for the assembly during removal from the heating medium and transfer to the refrigerating means.

In step 8 the assembly is subjected to a cooking cycle, with time and temperature factors being so controlled that the dough is completely cooked without materially melting or otherwise affecting the filler. Cooking can be carried out by use of a hot air oven, by immersing the assemblies in hot oil, or by introducing the assemblies into hot oil being subjected to a partial vacuum. The latter technique has a number of advantages, as will be presently explained. Irrespective of the method used for carrying out the cooking cycle, certain factors are controlled, including the temperature of the filling, the temperature of the surrounding heated medium and the time period of the cycle. For example, at the beginning of the cooking cycle the thickness of the dough may be relatively uniform and of the order of 1/16 to ⅛ inch, and the temperature of the filler well below 0° F. (e.g., −20° to −40° F.). If a hot air oven is used, the oven air temperature may be of the order of 450° to 600° F. and the cooking cycle continued at that temperature for a period of 4 minutes. Near the end of the baking cycle the assembly may be subject to radiant heat, as by the use of an overhead broiler heating element, to promote browning. If the cooking cycle is carried out by immersion in hot oil at atmospheric pressure, and the other factors are the same as just stated, the oil may be at an initial temperature of the order of 360° to 400° F., and the cooking cycle carried out over a period of 3 minutes. In the event the cooking cycle is carried out in the preferred manner by immersion in hot oil being subjected to a partial vacuum, as will be presently explained in greater detail, the initial oil temperature may be of the order of 440° to 600° F., the partial vacuum may be of the order of 28 inches mercury column, and the cooking cycle may be completed over a period of from 1 to 2 minutes.

At the end of the cooking cycle 8 the assemblies are removed from the heating medium, and the hot dough is immediately cooled. Initial cooling occurs by heat transfer from the hot cooked dough to the cooler backing layer and filling, and preferably is supplemented by refrigeration. Refrigeration can be applied immediately following cooling or after a short holding period and may cool the assemblies to a temperature level commonly used in the storage of frozen desserts, such as 35° to −40° F. for unfrozen fillings or from 0° F. to −40°

F. for frozen fillings. This serves to ensure cooling of the cooked dough and to maintain the identity of the filling. When the filling is frozen it ensures complete solidifcation of filling portions which may have become softened or melted during the cooking cycle, as for example, external peripheral areas and corners and edges of the filling. Generally such solidification of frozen fillings takes place during the short holding period referred to above. When cooking is carried out by immersion in hot oil being subjected to a partial vacuum, chilling may be applied in the special manner hereinafter described.

It has been found that when the procedure outlined in FIG. 1 is carried out without using the protective backing layer, a substantial amount of infusion or soaking occurs between the exterior portions of the filling and the surrounding the filling. According to my observations, this region of infusion or soaking is due in part to dough which has not been converted to a crumb state during the cooling cycle and which has absorbed or soaked up liquid or semi-liquid material from outer portions of the filling. This unsatisfactory region is visible between the cooked dough and the filing immediately after cooking, and after the cooked assemblies have been cooled following cooking. It impairs palatability in that the material of the region is somewhat sticky and may be gummy or even elastic and viscous like dough that has not been converted to a crumb structure by cooking. It is more pronounced and objectionable when the dough layer contains a chemical leavening agent whereby upon cooking the layer becomes cellular and expanded in volume.

I have discovered that the unsatisfactory infusion or soaking referred to above is avoided by providing the backing layer described above which serves as an insulating and protective backing during cooking, and which inhibits soaking of the dough and promotes conversion of the dough to form a crumb structure extending through the entire thickness of the dough layer. In general, the material from which the protective backing layer is made should be such that it does not penetrate either the dough layer or the frozen dessert filler to any substantial extent, before, during or after cooking, and does not of itself require cooking. It should be capable of forming an insulating barrier layer which retains its character both during and after cooking. It should not impair edibility or palatability of the finished product, and preferably should enhance palatability and flavor. It should be solidified and remain in such condition before and during cooking. Thus the temperature of the assembly immediately before cooking should provide a hard shell which has sufficient strength during and after the cooking cycle to afford structural support for the dough layer. In general, the protective backing layer prevents formation of an unsatisfactory infusion or soaking region as previously described, and at the same time it enhances rather than detracts from the palatability of the final product and promotes conversion of the dough to form a crumb structure in facial contact with the material of the protective layer. By imparting strength to the outer dough layer it aids in maintaining the size and shape of the assembly during cooking and makes possible a relatively thin outer dough layer that can be cooked in a short time.

As specific examples of suitable edible materials which can be used to form the protective layer, reference can be made to any one of several cheeses which can be applied in paste form to the inner side of the dough layer. By way of example, where the dough layer before cooking has a thickness of about ⅛ inch, a protective backing layer of cheese may be of substantially the same thickness. Other types of material which can be used include comminuted precooked cereal or other cooked farinaceous material to which a plasticizer such as water or sugar syrup is added to form a paste, sugar syrup to which cellulosic filler has been added to form a paste, confectioners almond paste, pre-baked cooky crumbs plasticized with water and/or fat to form a dough of paste-like consistency, and other forms of pre-baked cereal flour plasticized with water, fat and/or sugar syrup. When the paste or dough consists of pre-cooked cereal, various commercial forms of crushed or comminuted breakfast types of cereal can be used such as comminuted shredded wheat or cornflakes, which generally are formulated to include sugar and fat. When fat is a constituent, it preferably is a hard fat having a melting point of the order of 98° to 140° F. A sugar content may serve as a preservative in the final product. An example of a satisfactory cereal flour dough is one made by adding water to so-called pie crust sticks, after the sticks have been oven baked and crushed. Various additives can be used in formulating such pastes or doughs, including milk solids (e.g., nonfat milk), vegetable fat and preservatives (e.g., B.H.T. and antioxidants).

Assuming that the material of the protective layer consists of pre-cooked comminuted cereal or cookies, edible flavoring extracts and fats can be added, thus providing flavors such as orange, lemon, chocolate, cheese, etc. Edible dyes can also be introduced to provide desirable coloring which may be compatible with the flavor used.

The moisture content of the protective backing layer is relatively low compared to the moisture content of the outer dough. Thus in a typical instance, the moisture content of the protective backing, comprising precooked cereal, may be about 2 to 20%, depending on its formulaton, while the moisture content of the outer dough may be about 10 to 30%.

During preparation of the assembly, compatible topping materials can be applied adjacent to or blended with frozen dessert filler, thus providing a finished product comparable to an ice cream sundae. The topping may for example be chocolate syrup or marshmallow topping which hardens at temperatures below ambient, or edible confection particles or pieces like candied or glaceed fruit. Also whole or crushed nuts and fruit filling can be used in the same manner.

FIG. 1 shows steps 9, 10 and 11 employing a filling of the frozen dessert type. In step 9 a layer of dough having a protective backing layer is applied about the frozen dessert filler. As previously explained, the material of this layer can be in the form of a dough or paste which is applied as a thin layer to the inner surface 14 of the dough. In step 10 the assemblies are subjected to a cooking operation carried out in the manner previously described. In step 11 the assemblies following cooking are refrigerated to a low temperature, as in FIG. 1.

FIG. 1 also shows steps 12 – 15 which may be employed in place of steps 9 – 11. In step 12 the assembly from step 9 is chilled by refrigeration to a low temperature (e.g., preferably −20° to −40° F. for frozen filling). This serves to condition the assembly for the cooking cycle and to harden and strengthen the dough layer and its protective backing. Following the cooking cycle 13, the product may be held out of the cooking medium for initial cooling, during which time the product may be transferred to refrigerating means. For example the assemblies upon removal from the oven or hot fat are transferred to a cool pan and thereafter subjected to refrigeration. Cooling initially occurs from inside out, rather than from outside in, as in conventional baking. After initial cooling 14 the product is subjected to refrigeration 15 (e.g., 0° F. to −40° F. or lower for frozen fillings) for further cooling and storage. Refrigeration may employ conventional mechanical equipment or may employ liquid gas (e.g., nitrogen).

Figure 2:
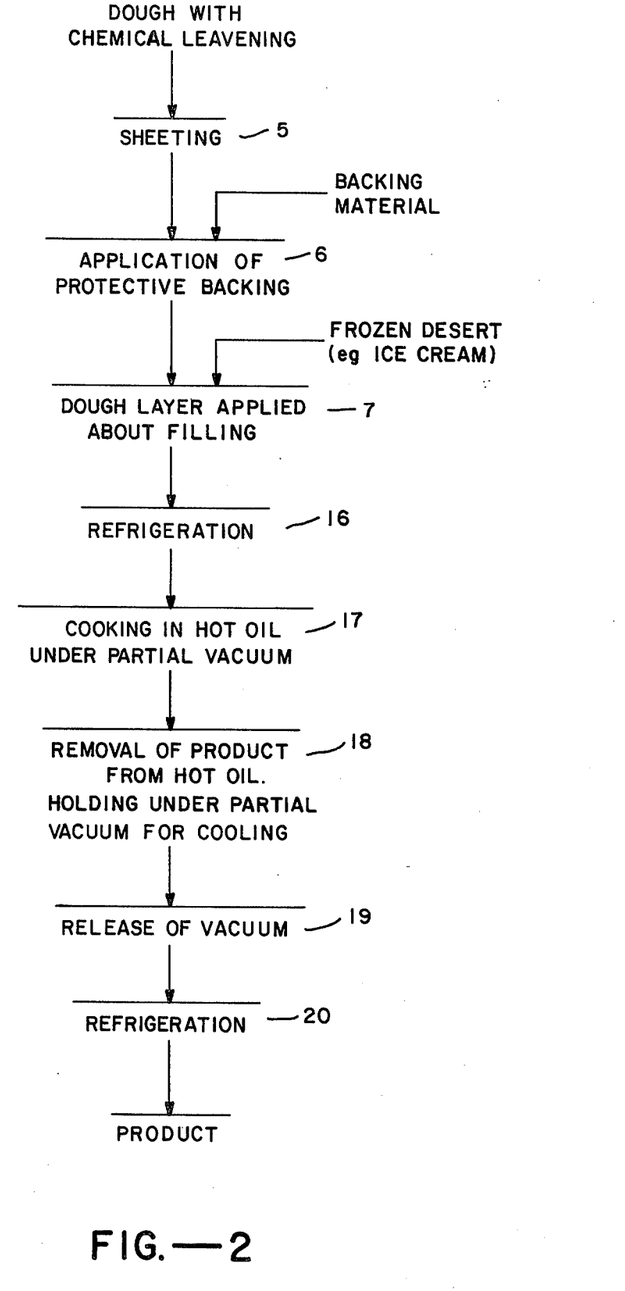
FIG. 2 is a flow diagram illustrating another embodiment of the method.

FIG. 2 shows steps applicable when the cooking cycle is carried out in hot oil or fat subjected to a partial vacuum. After applying the dough layer with a protective backing about a frozen filling in step 7 the assembly is refrigerated in step 16 and thereafter immersed in hot oil subjected to a partial vacuum in step 17. After a short rapid cooking period the product is removed from the hot oil in step 18, and held under the applied vacuum for cooling. In step 19 the vacuum is released and the product refrigerated in step 20.

Figure 3:
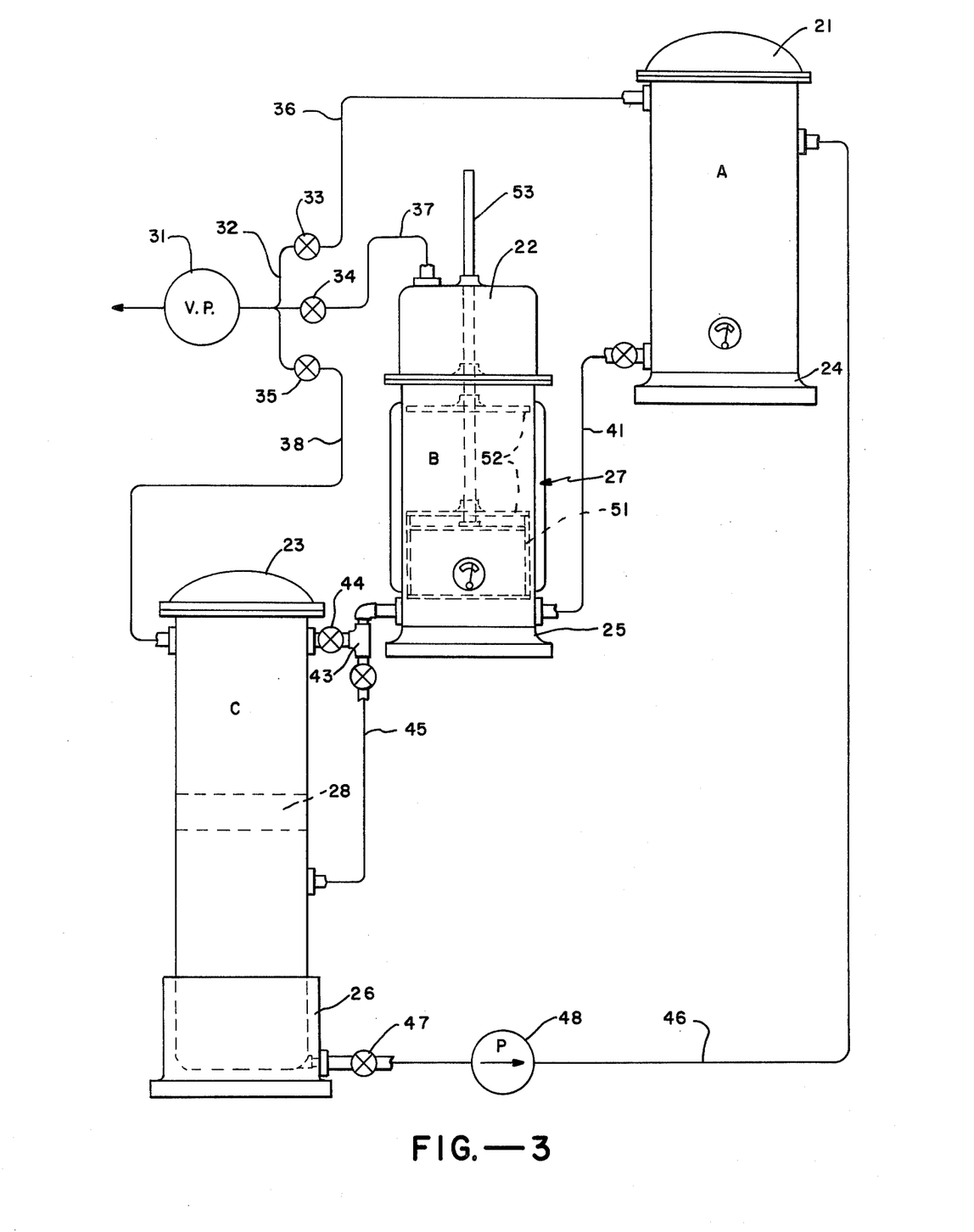
FIG. 3 is a schematic view illustrating equipment for carrying out one embodiment of the method.

FIG. 3 illustrates suitable apparatus for carrying out a cooking operation as in FIG. 2 in which the assemblies are introduced into hot oil while being subjected to a partial vacuum. The apparatus consists of three tanks A, B and C, which are provided with readily removable covers 21, 22 and 23. Also they are provided with suitable heaters 24, 25 and 26. Tank B is provided with a cooling tank 27 through which cooling water can be circulated. The interior of tank C is divided by a filter medium 28.

A suitable vacuum pump 31 connects with the vacuum manifold 32, which in turn is connected by way of valves 33, 34 and 35 with the lines 36, 37 and 38. Line 36 connects with the upper portion of tank A, line 37 connects with the top portion of the extended cover 22, and line 38 connects with the upper portion of tank C. The valves 33, 34 and 35 are so constructed that they can be positioned in closed, open or venting positions, the venting position serving to vent the associated line to the atmosphere. The pipe line 41 controlled by valve 42 connects between the lower portion of tank A and the lower portion of tank B. Another pipe line 43 controlled by valve 44 connects the lower portion of tank B with the upper portion of tank C. Another valve controlled line 45 connects with line 43 and with the tank C at a point below the filter 28. By directing the flow of oil through the line 45, the filter 28 can be bypassed. Line 26, which includes valve 47 and liquid pump 48, connects the lower portion of tank C with the lower portion of tank A.

The interior of tank B is shown provided with a perforated basket 51 adapted to contain a charge of products to be cooked. There is also a perforated plate 52 which is shown separate from the basket and which serves the purpose during the cooking cycle of overlying and retaining the products immersed in the hot oil. The plate 52 may slidably engage the rod 53 which slidably extends through the top of the cover dome 22 and has its lower end attached to the basket 51.

Operation of the apparatus shown in FIG. 3 is as follows. A suitable oil or fat (e.g., a vegetable cooking oil or lard) is introduced into tank A and is heated while being subject to a partial vacuum (e.g., 28 inches mercury column) to a temperature of the order of 350° to 600° F. (450° optimum). The dome 22 is removed from tank B, and after removal of the perforated plate 52 (or its removal together with the dome 22 if attached to rod 53) the basket 51 is loaded with the assemblies to be cooked. Plate 52 is then applied on top of the basket, the dome 22 is re-applied, and valve 34 is opened whereby the interior of tank B is evacuated to about 28 inches mercury column. Tank A is also evacuated by opening the valve 33, either before evacuating the tank B, while tank B is being evacuated, or in any event before commencing a cooking cycle. The valve 22 is now opened, thus permitting hot oil from tank A to flow by gravity through line 41 into the lower end of tank B. Instead of relying upon gravity flow, suitable pumping means can be applied. The level of oil in tank B rises to completely immerse the products in the basket 51, and rapid conduction of heat to the exterior surfaces of the products results in a rapid cooking cycle in which the major part of the moisture content of the dough layer is rapidly removed and simultaneously the dough is leavened and cooked and its outer surface browned to the desired degree. As an alternative and preferred method of operation, the basket is retained in a raised position until hot oil has been introduced into tank B, and then the basket is lowered to immerse the batch. Assuming that the filling is a frozen dessert, thawing and cooking progresses from the exterior surface through the entire thickness of the dough layer, but insufficient heat is transmitted through the intervening protective layer to cause any substantial deterioration or melting of the frozen dessert filling. Progressive thawing and cooking of the dough layer provides, together with the protective layer, sufficient strength for the dough during the cycle to prevent breakage.

Before or during the cooking cycle the valve 35 is opened to evacuate the tank C. At the end of the cooking cycle valve 44 is opened whereby oil from tank B flows by gravity into the upper end of tank C. Preferably before or during removal of the oil the basket is raised to a position above the surface of the oil. In tank C the oil percolates downwardly through the filter medium 28, thereby removing any solid constituents. After separating the hot oil from the products, the products can be held under the partial vacuum for the period of the order of from ½ to 3 minutes to provide an opportunity for heat transfer to occur between the cooked dough layer and the inner frozen filling, and to provide some evaporative cooling by virtue of the applied vacuum. This period of heat transfer within the assembly while the vacuum is retained and the dough is out of contact with the hot oil is desirable in that it causes rapid reduction in the temperature of the cooked dough, although the amount of heat transferred from the hot dough layer to the inner frozen filling is insufficient to cause any substantial melting or deterioration. The atmosphere above the oil is rarified because the vacuum is maintained, and thus during the holding period little if any heat is conducted from the atmosphere to the exterior surfaces of the cooked dough. If desired, cooling during this period can be augmented by circulating cold water through the cooling jacket 27.

At the end of the cooking cycle and the holding period referred to above, the vacuum is released in tank B by turning the valve 34 to venting position, and simultaneously tank A can be vented by turning valve 33 to venting position. The cover 22 is then removed and the cooked products removed from the basket 51. As previously explained in connection with FIGS. 1 and 2, the cooked products are then immediately chilled as by placing them in conventional food freezing equipment.

After oil has percolated through the filter 28 to the lower portion of tank C, valve 47 is opened and pump 48 is operated to transfer the oil from tank C back to the tank A. The apparatus is then in condition for carrying out the next cooking cycle. Throughout the operation described above, the oil in the various tanks can be maintained at a desired temperature level by controlling the energy supplied to the heaters 24, 25 and 26.

With operation as described above, the oil may at all times be maintained under vacuum. This is desirable because a frying oil at such temperature levels is subject to deterioration by oxidation in contact with the atmosphere.

It has been noted that when my products are made in the manner described above, utilizing apparatus such as shown in FIG. 3, the resulting products appear to have a longer shelf-life and are more edible and palatable than like products subjected to a cooking cycle in hot fat at atmospheric pressure. In the event any of the filling should exude from the products, it is dehydrated in the oil and any resulting solids are removed from the oil by filtration.

Figure 4:
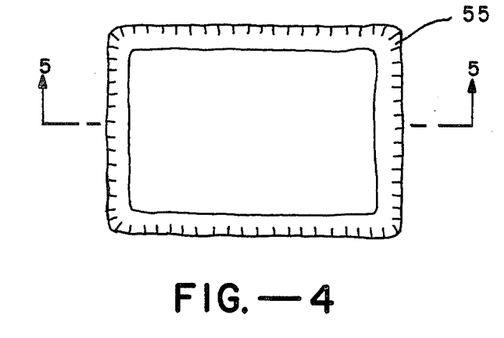
FIG. 4 is a plan view illustrating an assembly prepared for a cooking cycle.
Figure 5:
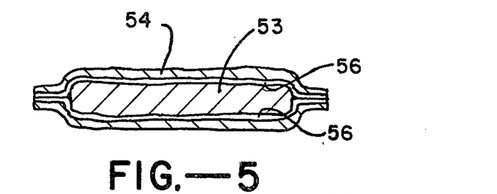
FIG. 5 is a cross-sectional view taken along the line 5 — 5 of FIG. 5 and showing the protective layer on the inner surface of the dough.
Figure 6:
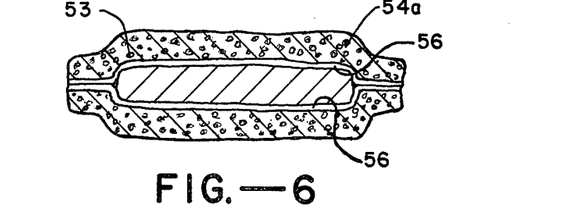
FIG. 6 is a view similar to FIG. 5 but illustrating the product after the cooking cycle.

FIGS. 4 – 6 illustrate one type of product which can be made according to the present method, both before and after completion of the cooking cycle. The filling 53 is a slab or block of pre-frozen dessert, such as ice cream having an overrun of the order of 30 to 200%, about 80% being optimum. It is enveloped by the layer 54 of dough which is disposed on opposite sides of the ice cream block and is provided with a crimping or seal 55 surrounding the edges. The dough in this instance is assumed to contain a chemical leavening agent which is activated by heat during the cooking cycle. The inner surfaces of the dough layers are shown provided with the protective backing layer 56 which can be made of one of the materials previously described. This protective layer may extend between the dough layers forming the crimped portion 55 and may assist in forming a seal capable of withstanding heat treatment in the cooking cycle without becoming separated. Assuming that the temperature of the block of frozen dessert is at a low temperature of the order of -20° to -40° F. or lower, proximity of the dough protective layer laminate and the cold filling serves to chill the laminate and dough to a comparable temperature to harden both the protective backing layer and the dough, thereby providing a hard structural shell of substantial strength. This makes it possible to employ a relatively thin layer of dough (e.g., 1/16inch thick) which in turn promotes rapid cooking with formation of the desired crumb structure throughout the thickness of the outer dough layer to the surface of the protective backing. Assuming that chilling is employed following fabrication of the assembly, and also assuming use of a frozen filling, it is applied within 1 to 4 minutes after an assembly is completed. As previously stated, it is desirable to refrigerate the completed assembly after its fabrication to a low temperature (e.g., 0° F. to -40° F.), and the assemblies may be stored under such condition.

After a cooking cycle as described in connection with FIG. 3, the product appears as in FIG. 6. The filling 53 is substantially the same as in FIG. 5. However, the enveloping outer dough 54 has been cooked to convert the same to a crumb structure, and it is expanded in volume with a cellular texture due to the action of the leavening agent and the partial vacuum. The protective backing layer 56 remains substantially intact and in intimate supporting contact with the cooked dough. Its temperature is substantially that of the filling because of its physical content therewith, and under refrigerator or frying temperatures, it is relatively stiff or rigid compared to the dough.

Figure 7:
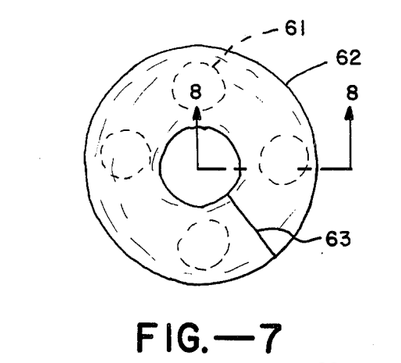
FIG. 7 is a plan view illustrating a doughnut-shaped product which can be made by the present method.
Figure 8:
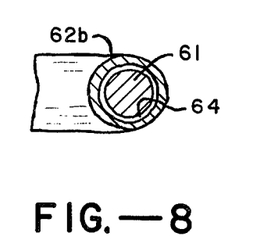
FIG. 8 is a cross-sectional view taken along the line 8 — 8 of FIG. 7 and illustrating the assembly before the cooking cycle.
Figure 9:
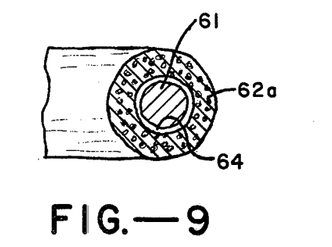
FIG. 9 is a view similar to FIG. 8 but illustrating the assembly after the cooking cycle.
Figure 10:
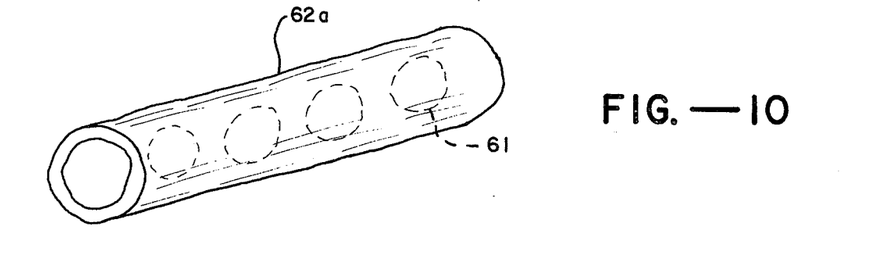
FIG. 10 is a perspective view illustrating a product which can be used in making the product of FIG. 7.

FIGS. 7, 8 and 9 illustrate another product embodiment which is shaped in the form of a doughnut. Thus as shown in FIG. 7, the product consists of the inner mass 61 of frozen dessert, and the enveloping cooked dough 62. The dough in this instance is of the doughnut pastry type dough provided with a chemical leavening agent. To form the product shown in FIG. 7, a tube 62a can be extruded as shown in FIG. 10. The frozen dessert masses 61 are positioned within this tube at spaced intervals. The tube is then bent to the doughnut form shown in FIG. 7, and the ends of the tube are sealed together along the line 63. Before the cooking cycle the assembly in section may appear as shown in FIG. 8. The thickness of the dough 62 at this time may be of the order of ⅛ to ¼inch. In preparing the assembly of FIG. 10, a layer is provided over the inner surface of the dough tube, the layer being of such material as to provide a protective backing as previously described. When the assembly formed from FIG. 10 is subjected to cooking in any of the manners previously described, the doughnut is cooked and expanded due to the action of the leavening agent, whereby in section the product appears as in FIG. 9. Here the expanded dough is indicated at 62b, and for the regions between the frozen masses 61, the expanded dough tends to expand inwardly as well as outwardly, thereby retaining the desired spacing between the masses 61.

Figure 11:
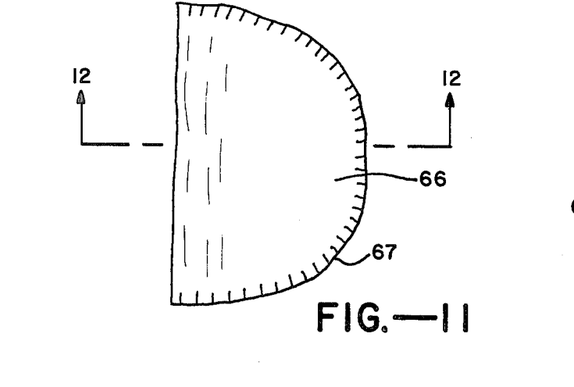
FIG. 11 is a plan view illustrating another embodiment of the product in the form of a turnover.
Figure 12:
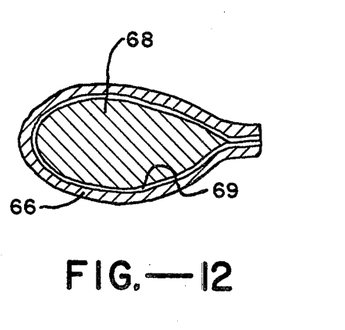
FIG. 12 is a section taken along the line 12 — 12 of FIG. 11.

A product somewhat similar to what is shown in FIGS. 4 – 6 is shown in FIGS. 11 and 12. In this instance the general shape of the product is similar to what is referred to as a turnover. The dough is formed into sheets and then after depositing a frozen dessert on one-half of a sheet, the other half is folded over and the edges crimped together. Thus in FIGS. 11 and 12, the dough layer is indicated at 66, and the crimp at 67. As shown in FIG. 12, the dough surrounds the inner frozen dessert 68. Prior to forming this assembly the inner surface of the dough is provided with the protective backing layer 69 interposed between the dough and the filler. The filler in this instance can be conveniently deposited in the form of a plastic soft ice cream whereby hardening of the filler takes place by chilling to a lower temperature (e.g., 0° F. to −40° F.) before the cooking operation. Such chilling conditions the assembly for the cooking cycle by hardening the filler, the dough and the protective backing layer, and by providing sufficient heat-absorbing capacity for the filling whereby the assembly can be processed in the cooking cycle without any substantial deaeration of the filling material.

The foregoing describes a number of embodiments of the method and product, including the embodiments making use of a frozen dessert filling. As previously indicated, features of the invention are applicable to fillings other than frozen desserts, as for example, preserved sugar syrup impregnated berries like raspberries, blackberries or strawberries and dried fruit jams, nut mixes like peanut butter, vegetable material like tomato paste, cheese and cheese mixes (e.g., fondues), meats or meat-containing material like mincemeat, poultry and fish fondue, and confection type fillings like fudge, caramel or honey. A number of such fillings, like preserved berries and fruits, have heat-sensitive components that are injured by heating to cooking temperatures. Also at temperatures ranging from 180° to 220° F. or higher to which the fillings may be heated in conventional oven baking or deep fat frying, such fillings are liquefied unless they have a relatively high content of stabilizing agents. By making use of an insulating backing applied to the inner surface of the dough layer, an assembly having such unfrozen fillings can be cooked by one of the described methods with the filling remaining intact and with a minimum amount of product spread. In addition to a lower terminal temperature of the filling due to the insulating backing layer, such a layer tends to minimize soaking of the surrounding dough by infusion of filling material during cooking and subsequent storage. Protecting the filling by lower terminal temperatures make possible less reliance on stabilizers (e.g., starch, gums, etc.) that may be used to maintain body viscosity. When assemblies as just described are fabricated, they may be cooked without refrigeration, refrigeratd short of freezing before cooking or frozen before cooking, depending somewhat upon the character of the filling. When the filling is not frozen, it should be so formulated by limited moisture content and/or by use of stabilizers to avoid substantial liquefaction during cooking. With respect to products processed without freezing, after cooking it is desirable to cool by refrigeration and store under refrigeration for marketing, although in some instances the products may be marketed without refrigeration.

With respect to products that may be marketed as such, in addition to the final cooked products, the assemblies without cooking or with partial cooking may be marketed under refrigeration. Also dough sheets comprising two laminations, one consisting of an uncooked farinaceous dough and the second being a protective backing layer (e.g., cooked cereal dough) can be sold under refrigeration or in frozen condition to the consumer trade for home use.

Examples of my invention are as follows:

EXAMPLE 1

A conventional pie crust type of dough was prepared from the following ingredients:

| Wheat Flour - all purpose | 100 lbs. |
| Shortening - hydrogenated | 60 lbs. |
| Salt | 1 lb. |
| Water (about 10% of flour content) | 10 lbs. |

The above ingredients were mixed in a conventional manner to form a dough. The dough was divided into two equal portions, one portion being sheeted in continuous cooky like strips on a sheet pan and baked to an essentially dry state and firm textured crumb structure. Subsequently these baked strips were ground in a hammer mill to a coarse powder of minus No. 8 screen size. This comminated material was mixed with about 3% water to form a reconstituted dough. A portion of this dough was then sheeted to about 1 inch thick in a continuous fashion by use of sheeting means of the reverse break type, and a similar thickness of the other dough portion deposited on top of the same. At a temperature such as to provide flowability of both doughs (e.g., 100° F.) the laminated material was sheeted to a thickness of the order of ⅛ inch combined thickness, with the uncooked and precooked doughs each having a thickness of about 1/16 inch. The resulting composite sheet comprised a relatively dry dough sheet affixed to an unbaked pie dough. After dividing into sheet sections of a size suitable for use in a Brooks-type turnover machine, the sheets were individually fitted between the rolls in the usual fashion, with the prebaked backing facing upwardly. This type of machine is provided with two die rolls facing each other with matched molds of a dimension and depth related to the dimension and quantity of filling desired. As a filling, ½ ounce of soft ice cream having an overrun of about 80% was introduced into each cavity. In the further operation of the Brooks machine rotation of the rolls served to fold the dough over the filling to seal and crimp the edges, and to trim off the excess dough. The weight of each assembly was slightly greater than 3.5 ounces, providing a ratio of filling to dough by weight of 40 to 60%. Immediately thereafter the turnover assemblies were subjected to chilling to a temperature of about −30° F. by subjecting them to an airstream at a temperature of about −40° F.

After chilling the turnovers were deposited in fat at a temperature of 380° F., making use of a conventional deep fat fryer. Initial heat transfer served to reduce the temperature of the fat to about 360° F., and thereafter the temperature of the fat was maintained at 360° to 370° F. for the duration of the cooking cycle. The products were turned to cook both sides in the fashion common to this process. It was observed that there was little if any exudation from the filler, which was attributed to the maintenance of the hard frozen state of the filling and to the firm prebaked and relatively dry backing layer. The hard state of the filling and the structural strength provided by the hard backing made the turnovers relatively rigid, thus enabling handling without excessive distortion or breaking in the fat, or during removal from the hot fat at the end of the cycle. The total cooking time was 3 minutes, and at the end of that time the products were removed from the oil and again subjected to chilling by refrigeration to about 0° F. to reharden any peripheral melted ice cream and to condition the filling for commercial storage and distribution. One of the turnovers was opened immediately after removal from the hot fat, and it was observed that the main body of the filling was hard with its core at about 16° F. This temperature increased outwardly, averaging about 20° F. about the core, and about 30° F. adjacent the backing layer. The overall hardened state of the filling was effective in sustaining the physical form of the turnover and the form and volume of the filling while within and after removal from the hot fat. The small amount of melting that did occur on exterior surface areas of the filler was solidified immediately after removal from the hot fat by chilling from the interior, thereby preserving its form and volume until refrigerated. This cold transfer after baking, outwardly from the low temperature surviving in the core, was also instrumental in effecting cooling of the hot baked outer dough layer before it unduly melted the adjacent filling. Cooling of the outer cooked dough layer imparted support to the physical structure of the product during its transfer from the hot oil to refrigerating means, thus preventing deformation and breakage. In this transfer the structure of the turnover, while still hot on the surface, was also obviously in part supported by the backing layer, which inspection showed to be firmer than the hot surface dough. Its firmness was in part attributed to its prebaked nature, and the rigidity imparted by its contact with the still cold filling.

Some of the turnover type of assemblies made according to Example 1, chilled to minus 30° F., were baked in a conventional oven preheated to 550° F. The turnovers were placed separately on a sheet pan, and after baking for 3-½ minutes, the overhead broiler heating element was activated for ½ minute to provide a total baking time of 4 minutes. They were then transferred to a cold pan and it was observed that their physical form was retained. During the first minute after removal the outer cooked dough layer cooled sufficiently to permit manual handling. They were then refrigerated to minus 0° F. It was apparent that the interior prebacked backing layer provided structure and durability such as would facilitate packaging and distribution without breakage.

EXAMPLE 2

The dough used in this example had ingredients as follows:

| Wheat Flour | 6 cups |
| Shortening | 4 tbs. |
| Sugar (corn) | 4 tbs. |
| Salt | 3 tsp. |
| Baking Powder | 3 tsp. |
| Water | 2 cups |

The dough prepared according to the above formulation was typical of a sweet roll type of dough. The chemical leavening agent (i.e., baking powder) was actuated by heat and caused leavening with development of a cellular texture during cooking. In preparing the dough all of the ingredients were placed in a mixer operated first at slow speed and then at a higher speed to develop a good dough texture. The amount of water was adjusted to produce a sheetable dough. After a holding period following mixing, the dough was sheeted to about ⅛ inch thick. This was then divided into sections and turnover assemblies were made as in Example 1, the same soft ice cream being deposited as a filling. No backing layer was used, since the purpose of the example was to demonstrate its functions when used according to the present invention. The turnover assemblies were then chilled as in Example 1 to a temperature of −20° F., and while frozen they were subjected to cooking cycles as follows:

1. Oven Baking with air temperature at 550° F for 3-¾ minutes, plus ½ minute at the end under boiler heating applied from an overhead broiler heater element situated about 3 inches above the assemblies.

2. Deep-Fat Frying at atmospheric pressure, with the fat being at an initial temperature of 360° F. and the frying time being 3 minutes, with the assemblies being turned over in the fat at least once.

3. Immersion of frozen assemblies in hot oil subjected to a partial vacuum and according to the method described in connection with the apparatus of FIG. 3. Initial oil temperature and partial vacuum were 460° F., and 29 inches mercury column, respectively, and the total cooking time was 1-½ minutes. Upon removal from the hot oil the turnovers were held in the partial vacuum for 1 minute before removal from tank B. During this period the hot oil was removed from the tank B by opening valve 44 conveying the fat to tank C. Upon removal from tank B the turnovers were refrigerated to a temperature below −20° F. to rapidly reduce the temperature of the filling, and then stored for marketing at 0° F.

Upon inspecting the products produced by each of the above cooking methods, it was found that in each instance there was a sticky layer interposed between the baked dough and the cold moist filler, which impaired palatability of the product. It was evident that this sticky layer was formed of dough which ranged outwardly from portions of the layer next to the filling, which had not been cooked to any extent, to portions more remote from the filler which were partially cooked with weak crumb formation. This appeared to be caused by the low temperature of the filling in cooking, as well as by moisture absorption of filling material which was softened or liquefied during cooking. During storage this layer tended to become more unacceptable, presumably because of moisture migration into this region. When using atmospheric fat frying some exudation of filling material occurred when the enveloping dough of the assemblies contained cracks or weak seams. This deteriorated the fat because the exudations contained sugar which caramelized. In contrast, in the vacuum method any weak spots tended to seal over due to the instant leavening effect, and thus exudations were inconsequential, even for areas where the filler was initially visable. Where exudations did occur during the vacuum method, it simply dehydrated without burning and without deteriorating the fat, and resulting solids could be readily separated from the fat by filtration. This absence of burning and fat deterioration was also a result of the great evolution of water vapor resulting from the vacuum method, coupled with an immersion time in the fat of one-half or less than the immersion time for atmospheric deep fat frying.

EXAMPLE 3

The dough used in this example was prepared as described in Example 2, except that the amount of cereal flour was reduced by one-fourth, and the amount of sugar used increased accordingly. The dough was first sheeted to about ⅛ inch thick. Material was separately prepared in paste form illustrating basic variants acceptable as a protective intervening layer. Five different types of such material were prepared as follows:

1. Conventional wire cut baked cookies were crumbled and made into a precooked reconstituted dough with about 5 to 10% added water.

2. Conventional pie dough described in Example 1 was prebaked in sheets and crumbled to form a comminuted mass. A precooked dough was formed by mixing with 10% fat which had been warmed to its softening point of 120° F. This dough was sheeted while at a temperature of 120° F.

3. A plastic paste was formed by mixing equal parts of grated Cheddar cheese, butter, flour and whole eggs. The grated cheese particulates were retained as such in the paste.

4. A Cheddar type cheese made plastic by heating to 100° F. was employed without further modification.

5. A plastic form of almond paste, which was stiff though sheetable at room temperature, was employed without modification. Its composition comprised sugar stabilized with comminuted almong nut meat. This was a product commonly used in the confection industry.

Each of the five protective backing materials had in common a plastic state that did not require additional baking to be acceptable by the consumer. Each of these backing materials was first sheeted to a thickness of ⅛ inch and then laminated with an uncooked dough sheet. The laminated sheet was further sheeted to a combined thickness of ⅛ inch, with each lamination being 1/16 inch thick. These laminated sheets were then used to prepare turnover assemblies with ice cream fillings, in the manner described in Example 1. The assemblies were chilled to a low temperature, as in Example 1, to freeze and harden the filling, and in addition to freeze and harden the protective backing layer. This hardening of the protective backing layer, which contacted the cold filling through the cooking cycle, provided a structural strength to the assemblies which was effective in preventing any spread of the filling during cooking. Also it aided in supporting the hot baked assemblies as they were removed from the cooking cycle and transferred to refrigerating means. In other words, the inner backing layer provided support which inhibited deformation and lateral spread as the hot baked products were mechanically transferred from the cooking means to a precooled receiving pan or conveyer and from thence to refrigerating means. All of these assemblies were then subjected to a cooking cycle in an oven in accordance with the oven baking procedure described in Example 2, the air temperature of the oven being about 550° F. The oven was provided with an overhead broiler element which was activated for a period from ½ to ½ minute at the end of the baking time. The total baking time was from 3 to 5 minutes, which served to complete baking of the outer dough throughout its thickness, with simultaneous leavening, and to impart an oven browned baked-out appearance to the product.

The products produced as described above in this Example 3 were all of good quality, and upon inspection of the baked assemblies it was observed that there was a complete absence of the unsatisfactory sticky layer of uncooked dough produced in Example 2. No sagging of the dough layer along the sidewalls of the assemblies was observed and the exterior dough had an overall cooked cellular structure with a well formed baked crumb. Lateral spread of the product in baking was confined to a desired degree. These properties of the method and product were attributed in part to the support afforded by the inner frozen filler, and also the hard chilled state of the protectve backing layer between the filler and the outer dough during baking. There was an absence of exudation of filler from the assemblies. Any such exudation during baking would have been a serious disadvantage because it would have caused burning when in contact with the hot pan, and would have made it difficult to remove the assemblies from the pan after baking. The protective layer was substantially intact in the final product in all instances. This was attributed in part to the composition of the baking layer, combined with the rigid structural support afforded by the frozen filler, and to the rigidity imparted to the backing layer through facial contact with the cold filler. The protective backing layer also contributed to the edibility, appearance and palatability of the final products, particularly in that it obviated any association with unbaked dough.

A feature of the foregoing Example 3 is the use of a relatively thin (1/16 inch) dough layer which is made possible by the support afforded by the inner protective layer. Use of thin dough is advantageous because it makes possible a short cooking time, which in turn minimizes the amount of heat transfer from the cooked dough to the cold inner filling. Besides the shortened baking time, and the successful preservation of low temperature in the filling surviving baking, this latent low temperature is effective in causing rapid afterbake cooling of the hot exterior cooked dough during transfer to conveying means and conveyance to refrigeration means, and during initial phases of refrigeration. This makes for rapid afterbake cooling of the cooked dough with hardening of any of the frozen filling that has softened or melted during baking. Thus this feature facilitates automating the method by use of baking transfer, conveying and refrigeration apparatus of the continuous type.

In connection with this Example 3, the protective backing materials were in some instances provided with coloring in addition to flavoring components. This provided a pleasing appearance in the baked assemblies, appearing as an extension or outer portion of the filling, or as an additional filling differing in flavor from the main filling.

It was found that the introduction of certain ingredients served to aid in inhibiting moisture passage from the filling to the outer dough layer. A particular ingredient for this purpose is a fat as used in formulation No. 2 of this Example 3. Other such ingredients are edible waxes and gums. Sugars when present in sufficient amounts function as a preservative to inhibit fermenation or growth of spores or molds.

Some of the assemblies prepared according to Example 3 were subjected to a cooking cycle making use of hot fat at atmospheric pressure like the deep fat frying technique described in Example 1. The resulting products were acceptable, and the inner protective backing layer served to protect formation of any sticky region during cooking or later during storage.

The procedure of Example 3 was also applied to frozen fillings including materials other than ice cream. Thus making use of the method of Example 3, in addition to the soft ice cream a fruit pie filling was deposited alongside of the frozen mass, the pie filling being one of the type illustrated by cherry, apple and berry and containing a starch boiled stabilizer. The added pie filling was frozen during chilling of the assembly before baking. This made a fruit ice cream pie type of product. Before eating the products were transferred from the storage freezer to a refrigerator at about 40° F. to permit the filling temperature to rise to about 20° F., thereby providing a filling consistency suitable for eating the fruit filling and the ice cream together. In the same manner, glace fruit and nuts, with or without conventional toppings such as chocolate syrup and marshmallow, were added to the ice cream. With respect to marshmallow, it was found best to eat the product soon after it was produced because storage tended to collapse the aeration of the marshmallow due to moisture migration from the adjacent ice cream filler. However, even partially collapsed it was an attractive filling, and its white appearance contrasted attractively with colored ice creams, and contributed to the connotation of an ice cream sundae turnover or tart.

Further tests demonstrated that the soft ice cream bases could be modified by adding cheese flavoring, grated cheese, rippled cheese fondue types, or mayonnaise; also by including base fruit and vegetable compositions to produce fillings comparable to fruit cocktail, fruit salad, or dietetic compositions. Other tests demonstrated that such foods as poultry, fish and meat could be added.

Various backing materials were used according to Example 3. Thus backing layers were used comprising dough made by mixing dry comminuted breakfast cereals with water, namely cornflakes, Cheerios, shredded wheat and Rice Crispies. The composition of such products included sugar and shortening, and in some instances the source cereals were blended.

EXAMPLE 4

The base dough in this tension was selected as suitable for sheeting or extrusion as employed in making filled cookies. It was formulated as follows:

| Cereal Flour | | 16 ounces |
|---|---|---|
| Shortening | | 4½ ounces |
| Corn Syrup | | 4 ounces |
| Granulated Sugar | | 5 ounces |
| Vanilla Flavoring | | 3 grams |
| Baking Powder | | 3 grams |
| Baking Soda | | 3 grams |
| Salt | | 3 grams |
| Eggs (1) | about | 2 ounces |
| Water | about | 2 ounces |

The protective backing layer was made from pre-baked crumbled chocolate cookies formulated as follows:

| Melted Chocolate | | 2 ounces |
|---|---|---|
| Flour (All purpose) | | 2 cups |
| Shortening | | ½ cup |
| Brown Sugar | | 1 cup |
| Baking Soda | | ½ tsp. |
| Water | about | 2 ounces |
| Eggs (1) | about | 2 ounces |

Cooky dough made with the above formulation was deposited as wire cut cookies which were baked and then crumbled, after which they were reconstituted as dough with addition of from 5 to 10% added moisture. Dough made according to the first formulation was sheeted to form lengths about 24 inches long, 4 inches wide and ½ inch thick. On top of these sheets were placed similarly formed sheeted lengths of the prebaked cooky dough. Its temperature and added moisture was such that its plasticity was similar to the base dough. Using a reverse type break, the two doughs were combined as a laminated single sheet about ⅛ inch thick, each comprising layers of equal thickness of prebaked reconstituted cooky dough and unbaked cooky type base dough. These laminated sheets in turn were subdivided into lengths of the order of 24 inches. Separately, ice cream blocks were prepared measuring 23 inches long, 1-½ inches in width and about 1 inch in thickness, frozen to a hard state and at − 15° to 20° F. These blocks were placed lengthwise on top of the prepared dough laminated sheets in direct contact with the backing layer, and the extending side margins of the dough were folded over the top side, with an overlap to form a seal. It was helpful to use wax paper as a pastry cloth in working and forming these assemblies. The assemblies were then inverted and deposited on a baking pan so that the overlapping side was in pan contact. Thereafter, the assemblies were subjected to further chilling to reduce the temperature of both the dough and the filler to minus 40° F. The pan containing these assemblies was placed in an oven for a cooking cycle, the oven having an air temperature of 550° F. The total baking time was 4 minutes, and during the last 20 seconds the broiler element was activated to cause surface browning of the dough by virtue of infrared radiation. Immediately after removal from the oven, the assemblies were transferred from the baking pan to a precooled perforated pan, which in turn was placed in a refrigerator cabinet where the assemblies were subjected to an air stream at a temperature of − 40° F., thereby chilling the entire assemblies to a temperature of at least minus 28° F. in a short time of about 2 minutes. It was found that the ice cream remained at a temperature well below 32° F. throughout the baking cycle. Actual temperature readings showed a core temperature of about 12° F., just out of the oven, and outer regions of filling at 20 to 30° F. Cooling commenced immediately upon removal from the oven and proceeded thereafter as described in Example 1. At a temperature of 0° F. these baked assemblies could be sliced to form items of suitable length (e.g., 1 inch). The items could be upended and packaged together, side by side in a suitable carton or wrapping.

Separately, I duplicated the above ice cream product using low fat yoghurt as the filler and preservative after baking and subdivision into desired dimensions, at 0° F. For best eating I transferred the product to refrigeration at 40° F., allowing time for the elevated temperature to equilibriate throughout the product. In one instance I slit the top of the bars linearly perforating both the outer dough and the inner back-up layer with a thin slit centrally located along the lineal dimension as in the fashion of fig bars to create an open faced product. As with fig bars, the baking served to divide the slit a bit so that in the baked product melted ice cream peeped through the slit, which with refreezing after baking hardened, producing a novel and appetizing appearance.

EXAMPLE 5

Composite laminated dough sheets were prepared and used in preparing turnover assemblies, as described in Example 1, except that the base dough was formulated as in Example 2. These assemblies were then chilled to a relatively low temperature of the order of − 20° to − 40° F.

The apparatus used in carrying out the cooking cycle was substantially as shown in FIG. 3. The oil used was refined lard. It was heated in tank A to a temperature of 460° F. in the presence of a partial vacuum of 29 inches mercury column. The cover of tank B was removed and a quantity of the above described assemblies was introduced into the basket 51, and the perforated plate 52 applied on top of the charge. The weight of the assemblies amounted to about 15 to 20% of the weight of the fat. The cover 22 was then re-applied and sealed, and valve 34 opened to evacuate tank B to the same vacuum as previously applied and present in tank A. After attaining near 29 inches mercury column in both tanks A and B, valve 42 was opened to permit the hot oil under vacuum to flow rapidly by gravity from tank A to the lower portion of tank B, with the body of oil thereby delivered into tank B serving to immerse the assemblies. Within tank B rapid evolution of water vapor occurred, with the result that the level of oil rose in vapor induced volume to more than double its normal volume. Water vapor was removed through pipe 37 and vacuum pump 31. During the first half minute of the cooking cycle, the oil temperature dropped from near 460° F. to start the lower order of 420° F., and the partial vacuum dropped to about 25 inches mercury column. For the next minute the temperature was held around 400° F. Should conditions require it, energizng of the heater 25 can be utilized to maintain the temperature fall to a range above 400° F. Generally, the partial vacuum is maintained at about 26 inches mercury column and under favorable conditions may increase to 27 inches. After a total cooking time of 1-½ minutes, valve 44 was opened to permit oil from tank B to drain into tank C, which in the meantime had been evacuated. The removal of oil required about 20 seconds. After a short holding time of about 1 minute, and with valves 42 and 44 closed, tank B was vented to atmospheric pressure. The basket containing the products was then removed, the lid 52 elevated, and the assemblies immediately subjected to refrigeration. At this point, it was determined that cooking of the outer cooled dough during the holding period of 1 minute in vacuum had reduced the surface temperature of the baked dough to where the assemblies could be manually handled (e.g., to about 140° to 160° F.). Refrigeration with forced draft cooling served to chill the assemblies within a minute or two to reduce the surface temperature below 32° and thence on down to 0° F. at which temperature they were ready for packaging, transportation, and consumer sales. The entire cooking cycle under vacuum, plus the holding time in vacuum for initial cooling of the baked dough was about 3 minutes. The resulting products were as shown in FIGS. 11 and 12.

Upon examination of the completed products the ice cream filling was found to be hard and with its original overrun and volume. The filling was bonded to the surrounding backing layer, with substantially no intervening air pockets. The enveloping exterior dough layer had a baked appearance, browned on the surface, and an interior cellular structure of baked crumb appearance. Expansion of the outer dough layer to from 2 to 3 times its original volume was attributed to the action of the leavening agent and also to the expansion caused by the partial vacuum. The inner backing layer retained its original dimensions. There was no appearance of unbaked, stringy or gummy interior material, either in the region where the backing layer contacted the ice cream filler, or in the region of contact of the outer cooked dough with the backing layer. The bond between the filler and the jacket, and the bond of the composite layers of the dough jacket were such that they did not break away individually in an undesirable fashion during eating.

The procedure described above was varied by retaining the basket 51 containing the assemblies and under vacuum, suspended in the upper part of tank B, until after transfer of hot fat under vacuum from tank A. Then the valve in line 41 was closed, and then the rod 53 and the basket rapidly lowered into the hot fat. In this fashion the immersion of fat about assemblies was both instant and simultaneous to all surfaces of assemblies. At the end of the cooking cycle and while maintaining the vacuum, the basket and the assemblies were elevated to rapidly separate the hot baked assemblies from the hot fat. The fat was then removed through line and valve 45 to tank A. During this holding period, excess surface fat drained from the assemblies, and some surface fat was absorbed into the baked dough so that the final product did not have an excessive film of fat on its surface. After this holding period (e.g., 1 minute) the products were removed from the vacuum chamber as described above. Where the filler is of delicate structure like many ice creams, and filling requiring low temperature, like yoghurt, this method of operation contributes to producing products of high quality. Vacuum deep fat frying (as in Example 5) is particularly effective in sustaining a high quality of frying fat. This is because in commercial production where there may be weak seams or weak spots, the instant leavening that develops serves to close over such seams and weak spots to inhibit filler exudation. Also, during cooking under vacuum, extensive evolution of water vapor appears to maintain exterior surfaces out of direct fat contact.

EXAMPLE 6

A doughnut type of product was made simulating what is illustrated in FIGS. 7 – 10. Sweet dough was used as described in Example 2. The technique used for carrying out the cooking cycle employed immersion in pre-frozen condition in hot oil being subjected to a partial vacuum as described in Example 5. The dough was extruded in the form of strips about 24 inches long, 2 inches wide, and 3/16 inch thick. A supportive protective backing 1/16 inch thick was placed on one side and was made of reconstituted precooked cooky dough as described in Example 4. Oval extrusions about ½ inch in diameter and 1 inch long of refrigerated prehardened ice cream were deposited at intervals along the strip. The dough was then rolled laterally in such fashion as to envelope the ice cream and to provide overlying edges for sealing. Thereafter the length was subdivided by cross cutting between the ice cream segments to provide items about 6 inches in length. Some of these lengths were bent to circular form and the ends sealed together leaving a central hole as in a doughnut. Bending tended to occur in regions between the solid or stiff ice cream. Other lengths were left substantially linear and the ends pinched together to form partial seals. These assemblies were chilled, cooked and rechilled as described in Example 5. The resulting cooked products were novel and attractive with good volume and splendid eating properties. Similar modified products were made utilizing a cheese fondue in place of the ice cream. The fondue was premolded into pieces dimensioned as indicated above.

EXAMPLE 7

A yeast leavened dough was prepared using the following formulation:

| | |
|---|---|
| 1 | cup scalded milk, cooled to 100° F. |
| 1 | cake bakers yeast slurried in ¼ cup of water at 100° F. |
| 2½ | cups cereal flour |
| 1 | whole egg |
| ⅔ | cup granulated sugar |
| ¾ | tsp. salt |
| 4 | tbs. shortening |

The above ingredients were formed into a dough in a conventional manner, after which the dough was held in a fermentation room serving to double its volume. The dough was then sheeted to about ¼ inch thick, and further held to permit its thickness to increase to over 5/16 inch. Sheets prepared in this fashion were laminated with confectioners almond paste, the paste being applied to one side of the dough sheet to a thickness of about 1/16 inch and a weight ratio of about 4 parts dough to 1 part almond paste. The almond paste comprised comminuted almonds, sugar and corn syrup. After applying the paste the dough sheets were further held for yeast development through proofing until the thickness regained to about 5/16 inch. Sections of the dough sheets were then used to make turnovers in the manner described in Example 1. The turnovers were frozen to a brittle state (−20° F.), and then some of these assemblies were baked in an oven. Some were deep fat fried, and some were cooked by immersion in hot oil being subjected to a vacuum in the manner described in Example 5. In all instances edible and palatable products resulted. However, it was noted that there was some burning along seams in deep fat atmospheric frying, where the almond paste was exposed to the frying fat. Also, the almond paste in seam regions tended to flower out into the fat with resulting fat deterioration. Such fat deterioration did not occur to any serious extent when cooking was carried out in hot oil subjected to vacuum. Any extrusions that did occur appeared to be dehydrated, leaving solids readily removable from the fat by filtration. It was also noted that dough leavened by fermentation was not further expanded during any of the cooking cycles referred to above, and this self-sealing during cooking due to expansion of the base dough having a chemical leavening agent did not occur.

EXAMPLE 8

A fig jam type of filling was prepared as follows:

| | |
|---|---|
| Calimyrna Fig Paste, a California variety, testing 76 Brix | 6 lbs. |
| Corn Syrup | 2 lbs. |
| Invert Syrup | 1 lb. |
| Granulated Sugar | 1 lb. |
| Vanilla Flavor | 5 grams |
| Lemon Oil extract | 5 grams |
| Salt | 20 grams |
| Water, about enough to attain 78 Brix | ½ lb. |

The base dough was the same as in Example 4, and the prebaked dough back-up material was the chocolate cooky dough of Example 4. The assemblies were prepared as in Example 4 and were baked in an oven at an air temperature of 550° F. A first set utilized the above fig jam at 78 Brix and were fabricated at ambient room temperature without recourse to chilling or freezing. The dough was sheeted to ⅛ inch and surfaced with chocolate cooky dough which was likewise sheeted to ⅛ inch. The composite layer was then sheeted to a combined thickness of ⅛ inch, with each layer 1/16 inch. Each composite sheet was 18 inches long and trimmed to about 4½ in width. The jam was extruded on each sheet to form a deposit 1-½ inches wide and ⅜ inch thick. The composite sheet, on a wax paper backing, was folded over the filling with edges overlapping to form a seal, and then the wax paper withdrawn. These lengths were deposited on a greased cooky pan with the lapping sides in pan contact. They were baked in an oven for 6 minutes at 550° F. (air temperature) and browned without recourse to the broiler. After atmospheric cooling at room temperature, they were sliced laterally into pieces whereby the filling and the interfacial layer were both clearly discernible along the cut faces. This provided an attractive appearance different from a conventional fig bar. The eating properties were also different in that the inner backing had a discernible different mouthfeel than conventional fig bars. It was found this different mouth feel could be accentuated by incorporating a hard fat or hard fat-containing material (e.g., baking chocolate) in the backing dough.

To demonstrate application of the invention to filling jams of higher moisture content, about 5% moisture was added to the above jam to reduce its Brix value to 74. The same bars were prepared and baked, using the same baking time and temperature. After baking the bars were stored and distributed at refrigeration temperatures of about 40° F. No refrigeration was employed before baking. Compared to the first group of bars, there was no discernible difference in oven spread, which was attributed to the presence of the backing layer. It is common knowledge in the fig bar industry that fig bars of 74 Brix are subject to molding during storage and distribution, and the bars tend to stick together. It was found that this was eliminated when the bars made as described above were stored at refrigeration temperature (e.g., 40° F.). Besides improving the shelf life the bars had a different appearance and eating properties compared to the first group described above. The value of employing a jam of lower viscosity (e.g., 74 Brix) is that it dissolves in the mouth more readily when eating. Thus the desirable flavor of Calimyrna figs is more discernible at 74 Brix than at 78 Brix.

In addition to the above, fig bars were made in the same general manner with both 68 and 64 Brix jams which possessed flavor superior to the more concentrated jams. The assemblies could be prepared without refrigeration, although spread during baking was minimized by refrigeration. Control assemblies were prepared without the backing layer and with a thicker dough layer (about ⅛ inch thick). The control group of assemblies required 8 minutes to bake the thicker dough in contrast with 6 minutes for the back-up layer group. The spread difference occurred in about the first 3 minutes of the baking cycle and continued in the fig bars without the backing layer, but did not occur to the same extent in the bars having a backing layer. The thinner dough of the backing type bars set more quickly to minimize lateral spread. Again, and in contrast with the control bars without backing, the backing layer was visible in the cut bars.

The above fabricating and baking procedure was repeated but with the jam diluted to 58 Brix for one group and 54 Brix for another. It was found desirable to cool the jams by refrigeration to about 40° F. before depositing, to afford greater viscosity. Also after fabricating the assemblies it was found desirable to store them under refrigeration at 40° F. before baking, to chill and somewhat harden the backing layer. Baking was carried out in the same manner as described above for the other fig bar assemblies When the bars were cut after baking, it was observed that there were no air pockets. For purposes of comparison, sample assemblies were prepared without a backing layer but under the same prebaking and baking conditions. It was found that with 58 Brix jam, even 68 Brix jam, objectionable air pockets were formed, which was attributed to some boiling of the filling during baking. It was concluded that the backing layer reduced the tendency of air pockets through better confinement of the relatively high moisture content jams. Bars with the backing were stored under refrigeration at 40° F. When eaten after a few weeks they demonstrated an eating consistency which was deemed superior to normal fig bars having fillings of the order of 80 Brix.

Additional assemblies of the fig bar type were made and baked as described in the above paragraph, except that the jam was at 50 Brix, comparable in viscosity to ordinary table jams. Due to consistency of the jam it was found that without freezing they could not be baked without extensive exudation and spreading and penetration of moisture through the backing layer into the outer dough. Freezing to minus 30° F. before baking greatly improved the product and the product remained stable while maintained at 40° F. When the temperature was lowered to ambient room temperature, moisture from the filling tended to penetrate the backing layer. Some additional bars were made and baked in the same manner as for the 40 Brix bars, except that Cheddar cheese was used for the backing layer. The frozen assemblies were baked in an oven with an air temperature of 550° F. for 6 minutes. After baking the bars were refrigerated (40° F.) and it was observed that the cheese backing significantly inhibited moisture migration through the backing for storage periods of several weeks, compared to storage for several days for the prebaked cooky double backing.

Example 9.

Sheeted dough was prepared with a backing layer, as in Example 4, and rolled to form 8 ounce units which were packaged in a manner common with refrigerated products. Latter, simulating a consumer, the packages were unrolled and several into portions about 8 inches square. These were used to prepare turnovers having fillings such as moist cheese fondue digs, meat stew, and chicken salad base containing mayonnaise. The assemblies were placed in a refrigerator freezer compartment until they were cooled to about 10° F. The assemblies were then baked as in Example 8. The turnovers that included a backing layer were superior to the conventional single dough refrigerated turnovers in that there was little if any extrusion of filling onto the pan. Presence of the inner backing material provided superior eating properties, and when the backing layer was of a color different from the filler or the outer dough, it appeared as an attractive frame outlining the filling. Also it was found that the backing layer could be used to introduce various flavors which were not impaired during baking.

What is claimed is:

1. A method for the manufacture of food products having an inner filler of frozen dessert and an outer layer of cooked dough, comprising forming a composite sheet consisting of a layer of uncooked farinaceous dough and a continuous layer of protective backing material applied to one surface of the dough, applying the composite sheet about the exterior surfaces of an edible frozen filling, with the backing layer adjacent the filling and between the filling and the layer of uncooked dough, subjecting the product to a cooking cycle whereby the dough layer is heated and cooked, the backing layer during the cooking cycle serving to protect the filling against undue heating and to inhibit infusion of filling material into the dough, the temperature and time factors of the cooking cycle being controlled to complete cooking of the dough layer without substantial cooking of the backing layer.

2. A method as in claim 1 in which at the end of the cooking cycle the product is immediately chilled by refrigeration.

3. A method as in claim 1 in which the cooking cycle is carried out by introducing the product into a hot air oven.

4. A method as in claim 1 in which the cooking cycle is carried out by immersing the product in hot oil.

5. A method as in claim 1 in which the cooking cycle is carried out by immersing the product in hot oil subjected to a partial vacuum.

6. A method as in claim 1 in which the assembly is cooled to a temperature below 0° F. before the beginning of a cooking cycle.

7. A method as in claim 1 in which the filling is frozen before and during the cooking and in which immediately after the heating cycle the layer of cooked dough is rapidly cooled by transfer of heat to the filling without thawing the filling.

8. A method as in claim 7 in which the rapid cooling is carried out under partial vacuum.

9. A method as in claim 1 in which the protective backing layer is precooked cereal dough.

10. A method as in claim 1 in which the protective backing layer is a precooked cooky dough.

11. A method as in claim 1 in which the exterior dough layer contains a chemical leavening agent and the backing layer does not contain a leavening agent.

12. A method as in claim 5 in which the leavening under vacuum is effective in closing seams and weak spots in the dough, thereby inhibiting exudation of filling material.

13. A method as in claim 12 in which incisions are made in the dough with exposure of the filling before cooking to provide a predetermined configuration and appearance after cooking.

14. A method as in claim 1 in which the filling is a frozen dessert which is at a temperature of from −20° to −40° F. at the beginning of the cooking cycle, the filling remaining frozen and intact as to volume and shape during cooking, and in which immediately following cooking the outer cooked dough of the assembly is cooled by flow of heat from the same inwardly to the frozen filling.

15. A method as in claim 14 in which the filling is frozen when the composite dough sheet is applied about the same and in which the assembly is chilled to a temperature of from −20° to −40° F. before the cooking cycle.

16. An edible food product resulting from the method of claim 1.

* * * * *